United States Patent
Jasinschi et al.

(10) Patent No.: US 6,504,569 B1
(45) Date of Patent: Jan. 7, 2003

(54) 2-D EXTENDED IMAGE GENERATION FROM 3-D DATA EXTRACTED FROM A VIDEO SEQUENCE

(75) Inventors: Radu S. Jasinschi, Hillsboro, OR (US); Ali Tabatabai, Beaverton, OR (US); Thumpudi Naveen, Beaverton, OR (US); Paul T. Babic-Vovk, Caracas (VE)

(73) Assignee: Grass Valley (U.S.), Inc., Nevada City, CA (US)

( * ) Notice: Subject to any disclaimer, the term of this patent is extended or adjusted under 35 U.S.C. 154(b) by 0 days.

(21) Appl. No.: 09/064,889

(22) Filed: Apr. 22, 1998

(51) Int. Cl.$^7$ ............................................... H04N 13/00
(52) U.S. Cl. ........................................ 348/43; 345/950
(58) Field of Search ................................. 345/426, 427, 345/419, 502, 586, 952, 949, 950, 951; 348/43, 42, 47, 36, 37, 38; H04N 13/00

(56) References Cited

U.S. PATENT DOCUMENTS

| | | | |
|---|---|---|---|
| 5,854,856 A | * 12/1998 | Moura et al. | 382/232 |
| 5,999,662 A | * 12/1999 | Burt et al. | 382/284 |
| 6,018,349 A | * 1/2000 | Szeliski et al. | 345/629 |
| 6,215,496 B1 | * 4/2001 | Szeliski et al. | 345/419 |

OTHER PUBLICATIONS

"Uniqueness and Estimation of Three–Dimensional Motion Parameters of Rigid Objects with Curved Surfaces", Roger Y. Tsai, IEEE Transactions on Patern Analysis & Machine Intelligence, vol. PAMI–6, No. 1, Jan. 1984.

"A Computer Algorithm for Reconstructing a Scene from Two Projections" H.C. Longuet–Higgins, University of Sussex, Jul. 13, 1981.

"Panoramic Image Mosaics", Heung–Yeung Shum and Richard Szeliski, Microsoft Research, Technical Report MSR–TR–97–23.

* cited by examiner

*Primary Examiner*—Nhon Diep
(74) *Attorney, Agent, or Firm*—Smith-Hill and Bedell

(57) ABSTRACT

A method of generating a 2-D extended image from a video sequence representing a natural 3-D scene first determines motion parameters for a camera that recorded the scene with respect to a bakcground object from the video sequence using a structure-from-motion algorithm. The motion parameters include a rotation matrix, a translation vector and a depth map representing the depth of each point in the background object from the camera. Next from the motion parameters and depth map the 2-D extended image is generated for the background object as a composition of the images from the video sequence using a plane perspective projection technique. The background object may be layered as a function of depth and flatness criteria to form a set of layered 2-D extended images for the background object from the video sequence.

17 Claims, 7 Drawing Sheets

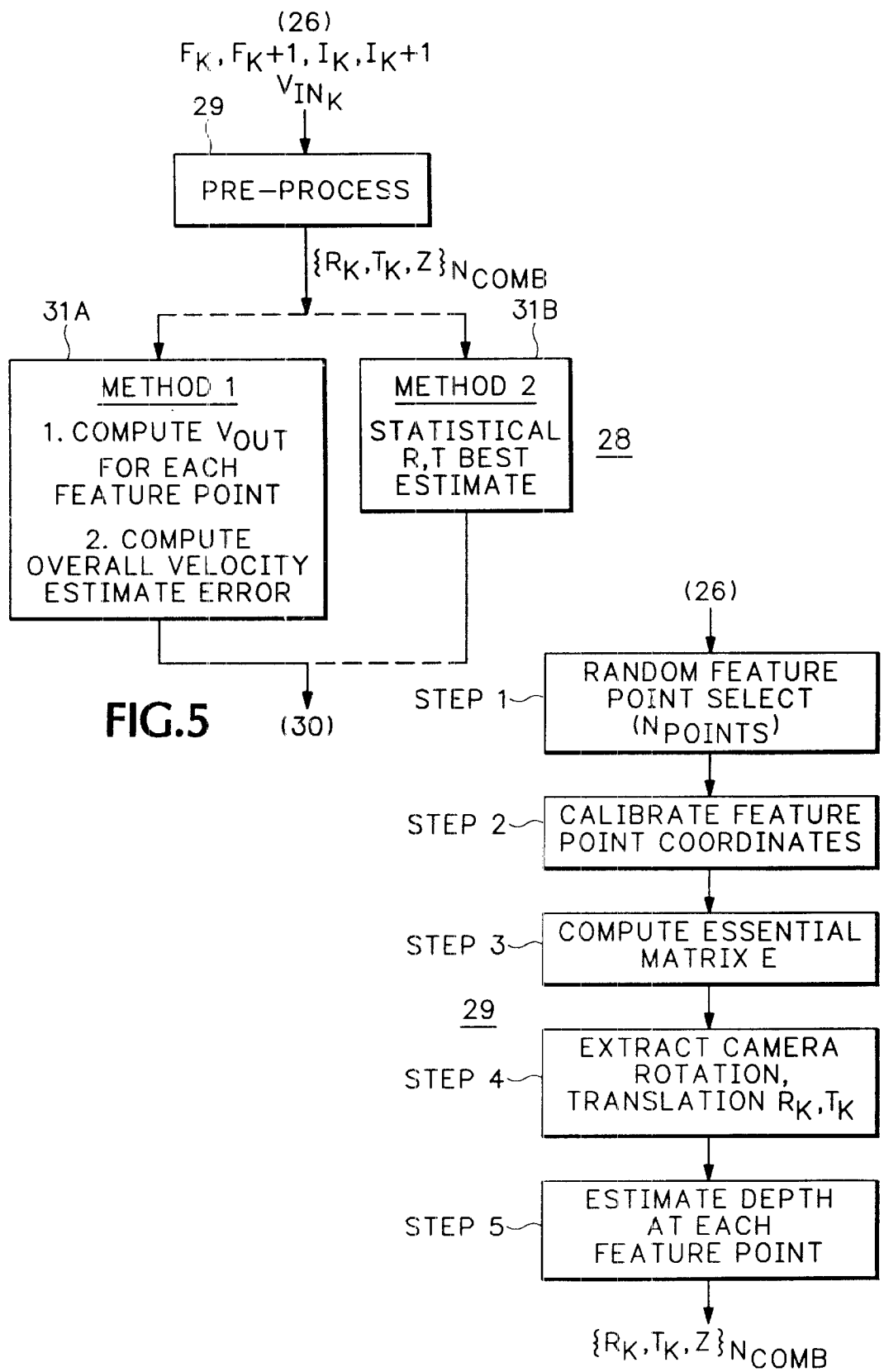

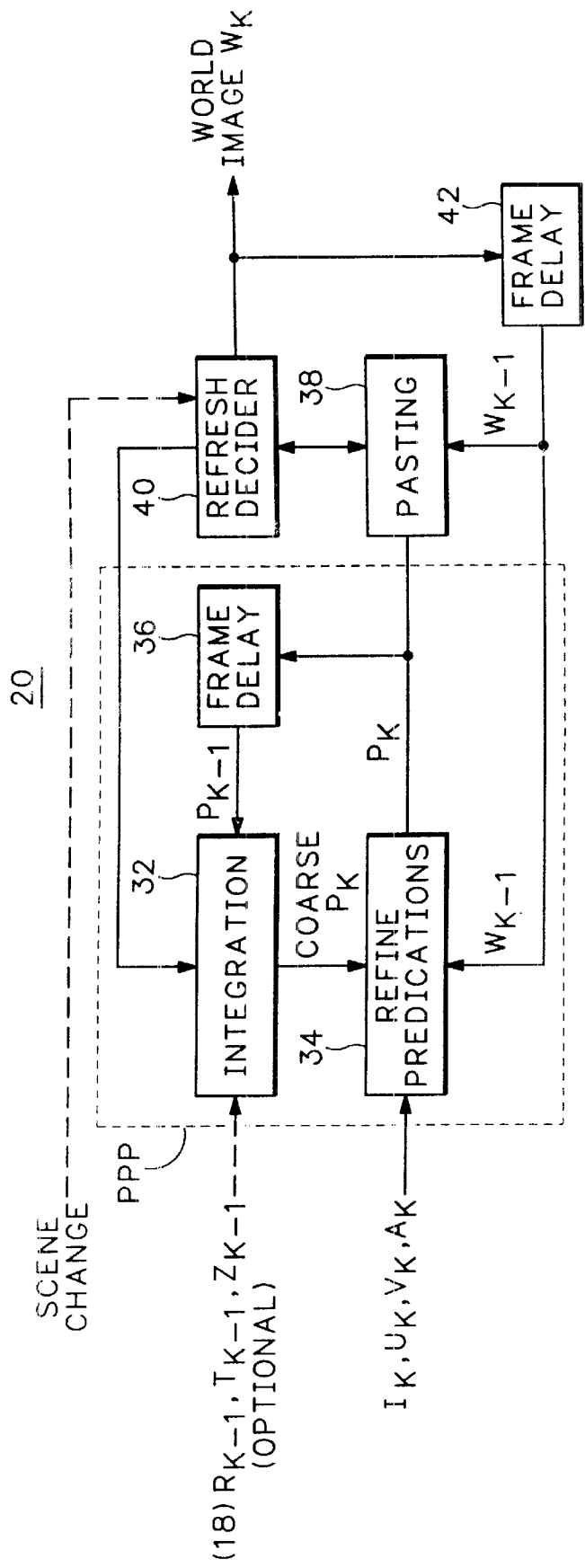

2-D EXTENDED IMAGE GENERATION FROM 3-D DATA EXTRACTED FROM A VIDEO SEQUENCE

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to the processing of video sequences, and more particularly to 2-D extended image generation from 3-D data extracted from a video sequence of a natural three-dimensional scene as observed through a monocular moving camera.

Presently video sequences provide two-dimensional images of natural three-dimensional scenes as observed through a monocular moving camera. Normally in order to produce three-dimensional objects or images a graphics generator is required for building such objects or images, which objects or images are then projected onto a two-dimensional plane for viewing as part of the video sequence. Three-dimensional manipulation of the three-dimensional objects or images is performed by the graphics generator, but the results are seen as a two-dimensional object or image in the video sequence.

What is desired is a method of generating 2-D extended images from 3-D data extracted from a two-dimensional video sequence.

BRIEF SUMMARY OF THE INVENTION

Accordingly the present invention provides a method of generating 2-D extended images from 3-D data extracted from a video sequence representing a natural scene. In an image pre-processing stage image feature points are determined and subsequently tracked from frame to frame of the video sequence. In a structure-from-motion stage the image feature points are used to estimate three-dimensional object velocity and depth. Following these stages depth and motion information are post-processed to generate a dense three-dimensional depth map. World surfaces, corresponding to extended surfaces, are composed by integrating the three-dimensional depth map information.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 5 is a general flow diagram view of a structure-from-motion (SFM) algorithm according to the present invention.

FIG. 6 is a flow diagram view of a pre-processing stage for the SFM algorithm of FIG. 5 according to the present invention.

FIG. 8 is a flow diagram view of a 2-D extended image generator according to the present invention.

DETAILED DESCRIPTION OF THE INVENTION

The present invention describes the generation of a 2-D extended image, referred to as a world image, sprite or wall paper, from a video of a natural 3-D scene as observed through a monocular moving camera. This 2-D extended image represents in some way, usually with some loss, the information contained in the video representing a natural 3-D scene. Also the original video, with some loss in quality, may be synthesized from this 2-D extended image. The method described below is divided into two parts: 3-D camera parameter estimation and 2-D extended image generation.

Figure 1:
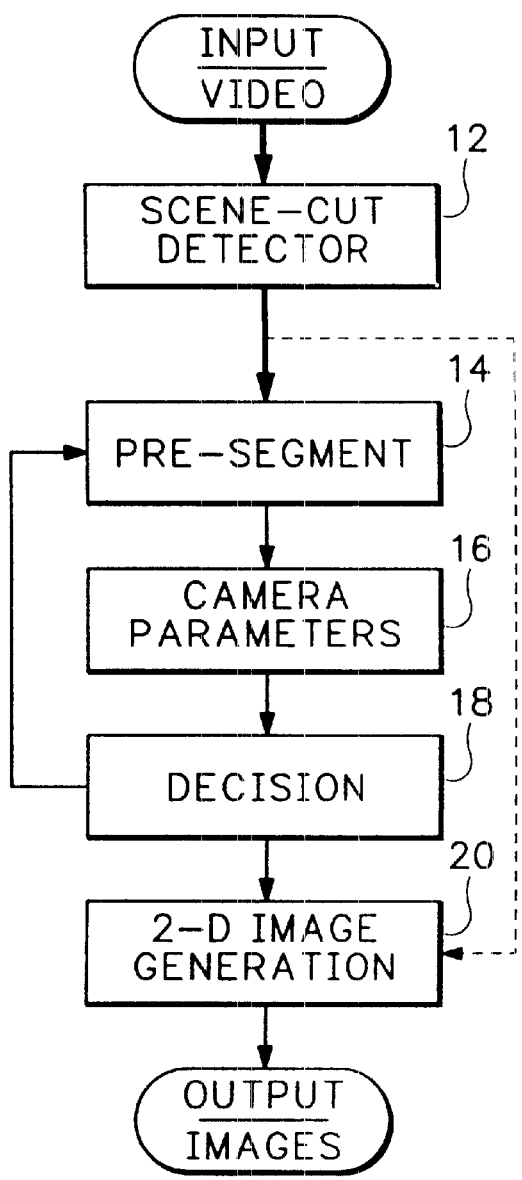
FIG. 1 is a flow diagram view for the generation of 2-D extended images for an object from a video sequence representing a natural 3-D scene according to the present invention.

Referring now to FIG. 1 a temporal sequence of raw video images representing a natural 3-D scene projected onto the moving camera is input to the system. A scene cut detector 12 identifies the temporal boundaries within the scene that make up an input video sequence, and the sequence of images that lies within such temporal boundaries constitute one scene shot. The images for the detected scene shot are input to a pre-segmentor 14 where objects are identified based upon various characteristics, such as color, shape and velocity, by using manual, semi-automatic or automatic processes. The pre-segmentation process also selects and tracks features on the objects from image to image within the scene shot. For example in a video clip of a tennis match, a tennis player may be identified as an object and the player's shoes or tennis racquet may be selected as features. The information from the pre-segmentor 14 is input to a 3-D camera parameter estimator 16 to estimate camera parameters, namely (i) the 3-D velocity of the objects in the scene and of the camera relative to some origin in 3-D space, and (ii) the depth of the objects from the camera. This depth and motion information is processed to generate a dense 3-D depth map for each object, as is described below. A decision block 18 determines the "flatness" of the object, and also provides feedback to the pre-segmentor 14 to assist in separating objects on the basis of depth layers. The depth map information and the scene shot images are input to a 2-D extended image generator 20 to produce a 2-D extended image for each object in the scene shot.

The 3-D camera parameter estimator 16 uses a structure-from-motion (SFM) algorithm to estimate camera parameters from the pre-segmented video, as described in greater detail below. Currently SFM is typically used to estimate the 3-D velocities and depths of points of rigid opaque objects. In this application SFM is used for two purposes: first to estimate the 3-D parameters of independently moving objects, called foreground objects, such as a car moving along a street in a video clip; and second to estimate the 3-D parameters of the scene shot's background, called background object, such as the audience in the tennis match video clip. The background object represents that part of the scene shot that is static in the world, i.e., has a zero velocity with respect to some point in 3-D space in a world coordinate system, while the camera and foreground objects may be in motion with respect to the same point. However in the video clip the background object may appear to be in motion because of the camera movement. The video clip therefore records the velocity of the background object with respect to the set of coordinate axes located at the focal plane of the camera. This apparent 3-D velocity of the background object is opposite in sign but identical in magnitude to the velocity of the camera with respect to the fixed point in 3-D space. Thus by estimating the apparent background velocity from the input video, the 3-D trajectory and orientation of the camera are determined with respect to the world coordinate system.

SFM currently requires that foreground objects be pre-segmented from the background object, and that feature points on the different objects be chosen manually. In this application feature points on the objects are automatically selected and tracked while these objects are still assumed to be pre-segmented. SFM, when applied to the background object, provides the 3-D camera velocity parameters and the depth from the camera of feature points in the background object. Using the camera velocity parameters, the depth is estimated at the feature points and the resulting values are interpolated/extrapolated to generate a depth value for each image pixel in the scene shot to provide a dense depth map.

The 2-D extended image generator 20 combines the results of the depth map compositing, using a planar perspective projection (PPP) model to generate the image. The PPP model has nine parameters, which enables the estimation or prediction of the 2-D extended image given any single image, i.e., current frame or snapshot of the scene shot. The PPP model parameters are also used to estimate or predict a current frame from the extended image. The depth map, which is generated for pairs of successive images, is combined with the PPP model parameters associated with the first image in the pair to generate approximate PPP model parameters associated with the second image. These approximate PPP model parameters are refined using a dyadic pyramid of the current image and the second image in the pair. The current image represents the composition of the images in the scene shot up to and potentially including the first image in the pair. The final PPP parameters along with the second image are used to update the current extended image to include the second image.

As indicated above, structure-from-motion is a method by which a 3-D rigid object velocity (motion) and depth (structure) may be estimated using different 3-D views of the same scene. The present SFM implementation provides a robust estimation of the 3-D camera motion parameters and the depth at selected points in the 3-D scene shot from a mono-scopic video sequence, i.e., video recorded by a monocular camera. Independently moving objects, i.e., foreground objects, in the scene shot are pre-segmented as described above.

The 3-D camera velocity is estimated from a set of image feature points belonging to static parts, i.e., background objects, that are extracted from and tracked through the scene shot being analyzed. For a static 3-D scene as recorded by a moving camera, the effective motion of the feature points projected onto the camera's focal plane is related to the camera's 3-D motion. In fact a camera moving along a 3-D trajectory induces an "equal and opposite" motion on its focal plane for any feature point. In the absence of camera motion the velocity of the feature points is zero. Non-zero feature point velocity is used in SFM to estimate the camera's 3-D motion parameters, also known as "egomotion", and trajectory. The camera velocity is described by the parameters of rotation and translation in 3-D space. Once these parameters are known, the scene depth at the feature points may be estimated, since scene depth is merely the distance between the feature point and the camera.

Figure 2:
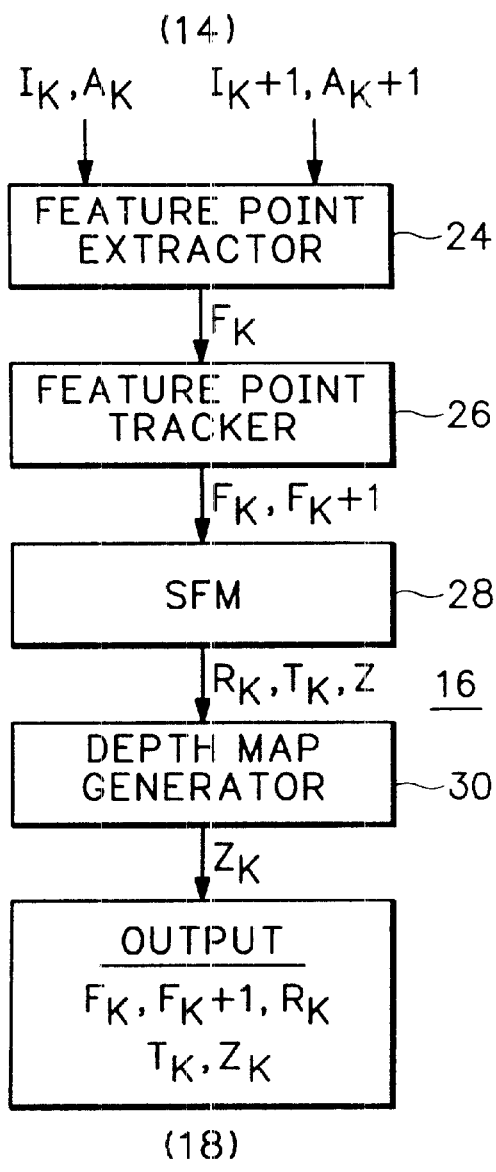
FIG. 2 is a flow diagram view of a camera motion parameter estimator according to the present invention.
Figure 3A:
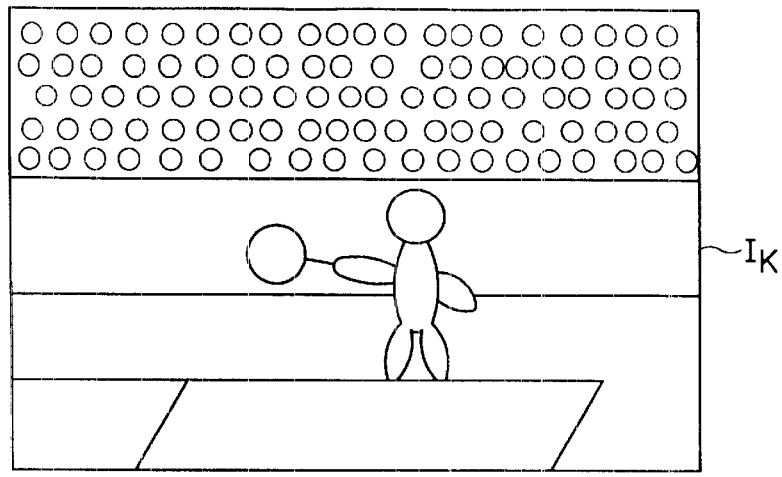
FIGS. 3A, 3B and 3C respectively are illustrations of an image in a scene shot from the video image sequence, a mask for the image defining the object, and a 2-D extended image for the defined object according to the present invention.
Figure 3B:
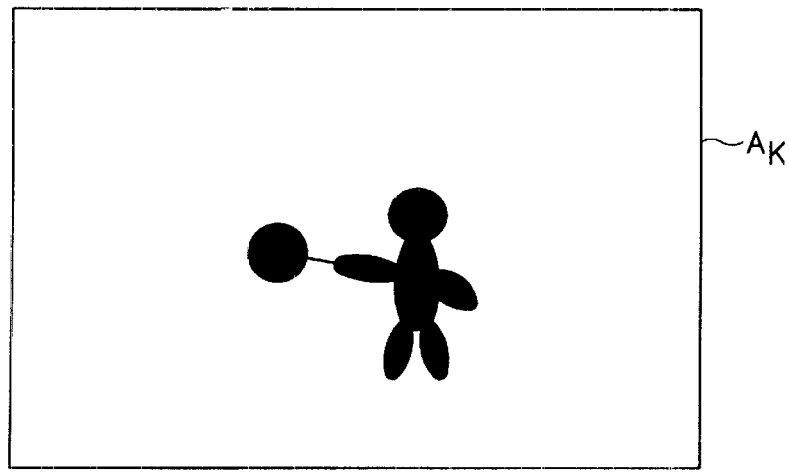
Figure 3C:
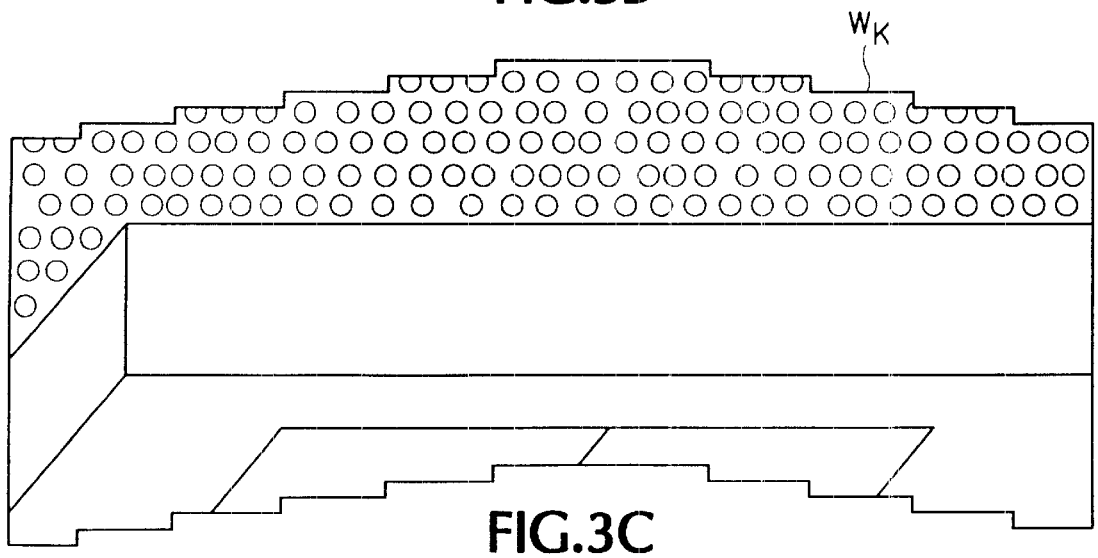

The 3-D camera parameter estimator 16 has the following submodules, as shown in FIG. 2: (i) feature point extractor 24, (ii) feature point tracker 26, (iii) structure-from-motion 28, and (iv) depth map generator 30. The inputs to the 3-D camera parameter estimator 16 are raw video images, denoted by $I_k$, and the corresponding "alpha" images, denoted by $A_k$. The alpha image is a binary mask that determines the "valid" regions inside each image, i.e., regions of interest or objects, as shown in FIG. 3 where FIG. 3A represents an image $I_k$ from a tennis match and FIG. 3B represents the alpha image $A_k$ for the background object with the tennis player blanked out. The alpha images are obtained from the pre-segmentor 14, either through a rough pre-segmentation or through user interaction.

Feature points are the salient features of an image, such as corners, edges, lines or the like, where there is a high amount of image intensity contrast. The feature points are selected because they are easily identifiable and may be tracked robustly. The feature point extractor 24 may use a Kitchen-Rosenfeld corner detection operator C, as is well known in the art. This operator is used to evaluate the degree of "cornerness" of the image at a given pixel location. "Corners" are generally image features characterized by the intersection of two directions of image intensity gradient maxima, for example at a 90° angle. To extract feature points the Kitchen-Rosenfeld operator is applied at each valid pixel position of $I_k$. The higher the value of the operator C at a particular pixel, the higher its degree of "cornerness", and the pixel position (x,y) in $I_k$ is a feature point if C at (x,y) is greater than at other pixel positions in a neighborhood around (x,y). The neighborhood may be a 5×5 matrix centered on the pixel position (x,y). To assure robustness the selected feature points have a degree of cornerness greater than a threshold, such as $T_c=10$. The output from the feature point extractor 24 is a set of feature points $\{F_k\}$ in image $I_k$ where each $F_k$ corresponds to a "feature" pixel position in $I_k$.

Given a set of feature points $F_k$ in image $I_k$ the feature point tracker 26 tracks the feature points into the next image $I_{k+1}$ of the scene shot by finding their closest match. "Closest match" is defined by the pixel position in $I_{k+1}$ that maximizes a cross-correlation measure CC defined as:

$$CC = \{W^2(\Sigma_{m,n} I_k(x+m,y+n) I_{k+1}(x'+m,y'+n)) - (\Sigma_{m,n} I_k(x+m,y+n))(\Sigma_{m',n'} I_{k+1}(x'+m',y'+n'))\} / \{SQRT(W^2(\Sigma_{m,n} I^2_k(x+m,y+n))$$
$$-(\Sigma_{m',n'} I_k(x+m',y+n'))^2\} * 1/\{SQRT(W^2(\Sigma_{m,n} I^2_{k+1}(x'+m,y'+n)) - (\Sigma_{m',n'} I_{k+1}(x'+m',y'+n'))^2\}$$

evaluated by overlapping a $D_v \times D_h$ intensity neighborhood around the feature point at (x,y) in image $I_k$ over an equal sized neighborhood around a candidate target pixel (x',y') in $I_{k+1}$ for $W=(2D_v+1)(2D_h+1)$. CC has a value of one if the two neighborhoods being compared are identical, and minus one if they have exactly opposite intensity profiles. The feature point tracker 26 gives a "closest match" point in $I_{k+1}$ corresponding to each feature point in $I_k$. Each pair formed by a feature point in $I_k$ and its closest match in $I_{k+1}$ is referred to as a "feature point correspondence" pair.

In order to improve robustness and increase processing speed in the feature point tracker 26, four additional processes may be used:

(i) Outlier removal due to low cross-correlation—every feature point correspondence pair must have an associated cross-correlation that is greater than a threshold $T_{cc}$. Feature points whose closest matches do not satisfy this threshold are eliminated. Further feature point correspondence pairs are sorted in descending order according to their cross-correlation values, the higher cross-correlations being the most reliable ones, and vice versa. A $T_p$ percentage of feature point correspondence pairs with the lowest cross-correlations are eliminated from the correspondence list. Representative values for $T_{cc}$ and $T_p$ are 0.9 and 40 respectively.

(ii) Outlier removal due to lack of strength—a feature correspondence pair $(x,y)<-->(x',y')$ in $I_k$ and $I_{k+1}$ respectively is strong if a bidirectional matching criteria is satisfied by the feature points involved, i.e., the closest match of a point $(x,y)$ in $I_k$ must be the point $(x',y')$ in $I_{k+1}$, and conversely the closest match of the point $(x',y')$ in $I_{k+1}$ must be the point $(x,y)$ in $I_k$. Otherwise the correspondence is weak and is eliminated from the correspondence list.

(iii) Hierarchical matching—in order to increase speed of establishing feature point correspondences, a hierarchical approach is used in which the closest matches are searched for using a Gaussian pyramid of the images involved, as explained further below.

(iv) Subpixel resolution match refinement—in order to increase accuracy of matching after the closest matches have been determined at pixel resolution, a local refinement of the matches is done at subpixel resolution, such as by adapting the method described in U.S. Pat. No. 5,623,313.

Figure 4:
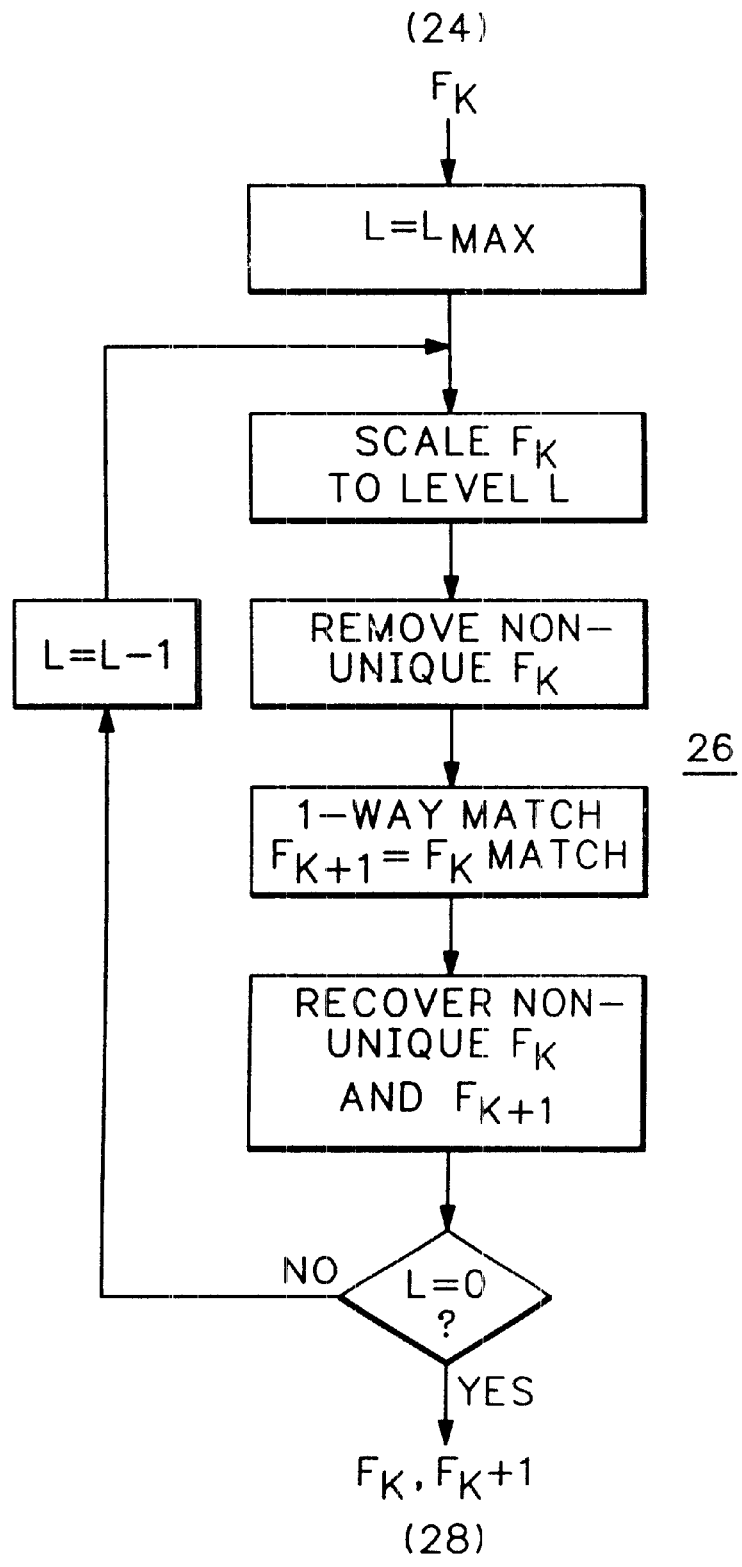
FIG. 4 is a flow diagram view of a hierarchical matching scheme according to the present invention.

The process of finding closest matches using hierarchical matching is shown in FIG. 4. Depending upon the expected maximum image velocity, the number of pyramid levels required $L_{max}$ is estimated:

$$L_{max} = \{L | \Sigma_{i=1->(L-1)} S^i < V_{max} < \Sigma_{i=1->L} S^i\}$$

where $V_{max}$ is the maximum expected image velocity, which may be provided by the user in lieu of a default, and S is a specified search range per pyramid level in pixels per frame, such as +/−2 range about the target pixel. The inputs to the hierarchical matching are the feature point set $F_k$ in image $I_k$ and the $L_{max}$-level Gaussian pyramid of images $I_k$ and $I_{k+1}$. For the initial conditions $F_{k+1}=F_k$ and $L=L_{max}$. As shown in FIG. 4 the steps include:

1. Decimate point in $F_k$ to level L, i.e., input feature point $F^i_k=(x_i,y_i)$ becomes round($x_i/2^L, y_i/2^L$)—if $L=L_{max}$, decimate points in $F_{k+1}$ to level L.

2. Due to this decimation/rounding of point positions, $F_k$ points that are close together at the bottom of the pyramid may merge into the same point higher up in the pyramid. To save time and without loss of accuracy these "redundant" points are temporarily removed in the higher levels of the pyramid. An inheritance list, describing the mapping of all points $F_k^i$ into unique (non-redundant) points, is stored.

3. One-way match—closest matches are found for the unique decimated feature points in $F_k$. The corresponding points $F^i_{k+1}=(x'_i,y'_i)$ are used as "initial guesses" for the position of the closest matches, i.e., the cross-correlation operator CC is applied between each point $F_k^i$ and each point $(x',y')$ in a forward search neighborhood around the point $F^i_{k+1}$. The position $(x',y')$ that maximizes CC is stored as $F^i_{k+1}$. In this step the images used are those of the $L^{th}$-level of the Gaussian pyramid.

4. Using the inheritance list redundant points are restored, assigning to them their corresponding closest matches.

5. Bring the points in $F_{k+1}$ one level down the pyramid so that feature point $F^i_{k+1}=(x'_i,y'_i)$ becomes $(2x'_i, 2y'_i)$.

6. Set $L=L-1$.

7. Repeat the above steps until and including when $L=0$—when $L=0$ the data set $F_{k+1}$ represents the closest matches of $F_k$ in $I_k$. Step 5 is not executed, and the outlier removal due to low cross-correlation is enforced.

After the above "forward matching" is completed, the weak matches are removed by "backward matching", i.e., for each point $F^i_{k+1}$ the cross-correlation operator is applied in all points $(x,y)$ in a backward search neighborhood around $F_k^i$. If the point that maximizes CC is different from $F_k^i$, then this point is a weak match and is rejected. A less strict constraint is to accept such $(x,y)$ if it falls within a radius $r_{strong}$ around $F_k^i$. If the backward search neighborhood is large, then the backward matching is done hierarchically to save time. The resulting output from the feature point tracker 26 is a set of strong, robust feature point correspondence pairs contained in point sets $F_k$ and $F_{k+1}$.

The SFM submodule 28, as shown in FIG. 5, provides estimates for a camera rotation matrix R and a camera translation vector T, which are done following an "essential matrix" approach to SFM. Since this approach is sensitive to input noise, two different approaches may be used that result in accurate 3-D camera parameters. Both of these approaches require a "preprocessing stage" in which different sets of camera parameters are estimated. Then the best possible answer is chosen from the approach followed.

The preprocessing stage 29 has as inputs the feature point correspondence pairs contained in $F_k$ and $F_{k+1}$, the images $I_k$ and $I_{k+1}$, and measured feature point velocity vectors, $Vin_k^i = (v^i_{k,x}, v^i_{k,y}) = F^i_{k+1} - F^i_k = (x'_i, y'_i) - (x_i, y_i)$. The initial conditions are: divide $I_k$ into approximately idential image blocks $B^j_k$, i.e., rectangular image regions, for $j=\{1, \ldots, N_{points}\}$ so that each block "contains" approximately the same number of feature points $F^i_k$ associated with it, and each point $F^i_k$ belongs to one and only one block. Each block exclusively represents one region of $I_k$. This enforces that the feature points used in the estimation of the camera parameters span the whole extension of the input image, resulting in a more general, robust set of parameters. The preprocessing stage 29 is shown in greater detail in FIG. 6, as described below.

Step 1: From each block randomly draw one feature point correspondence pair according to a uniformly-distributed random number generator so that all feature point correspondence pairs within each block are likely to be chosen—the result is $N_{points}$ feature correspondence pairs that span over the whole of $I_k$.

Step 2: Calibrate the feature point coordinates using a coordinate calibration transformation so that (i) the spatial center of mass of the feature points is approximately at the (0,0) coordinate origin and (ii) the feature points fall approximately with a radius of SQRT(2) of the center of mass—this results in a more stable estimation of an essential (E) matrix. The fastest, easiest transformation is:

$$\begin{vmatrix} x_i^n \\ y_i^n \end{vmatrix} = \begin{vmatrix} 2/(N_{cols}-1) & 0 & -1 \\ 0 & 2/(N_{rows}-1) & -1 \end{vmatrix} \begin{vmatrix} x_i \\ y_i \\ 1 \end{vmatrix}$$

where $(x_i^n, y_i^n)$ becomes the "normalized" $(x_i, y_i)$ image position, and $N_{rows}$ and $N_{cols}$ are the number of rows and columns of $I_k$ respectively.

Step 3: Compute the essential matrix E using the above normalized $N_{points}$ point correspondence pairs.

Step 4: Extract the camera rotation matrix R and the camera translation vector T from the computed essential matrix E.

Step 5: Given R and T estimate the depth $Z_i$ at every feature point $F_k^i$.

The above steps should be repeated enough times to exhaust all possible combinations of feature points. However such an approach may be intractable from a computational point of view—the total number of operations may be too large to be feasible for realtime implementations. Instead a robust suboptimum statistical approach determines the choice of the "best" set of camera motion parameters from a subset of the possible combinations. Therefore the above steps are repeated $N_{comb}$ times, resulting in approximately $N_{comb}$ different estimated sets of 3-D camera motion parameters.

The robustness and speed of the preprocessing may be enhanced by the following two steps:

(i) After Step 3 and before Step 4 above, compute depth values Z for each feature point in the set of $N_{points}$. If at least one out of the $N_{points}$ depth values has a different sign, i.e., all $N_{points}$ depths but at least one have a positive sign, there exists at least one outlier in the set of randomly chosen $N_{points}$ points and, therefore, it is very likely that the resulting E matrix will be erroneous, hence making the remaining Steps fruitless. In such a case, especially when the level of outliers in the input data sets is high, throwing away this combination of points both reduces overall processing time, for time is spent only on meaningful combinations, and increases the confidence in the final results.

(ii) If $Vin_k^i$ is zero for all $N_{points}$ randomly chosen points, then according to this combination of points the camera is static, i.e., to save time instead of computing the E matrix and extracting camera parameters the result of this combination is automatically set to a motionless camera—R=diag(1,1,1) and T=[0,0,0]$^T$.

After the preprocessing stage is completed, the $N_{comb}$ sets of R, T and $Z_i$ represent candidate solutions for camera parameters. Then the best set is determined by one of the following two methods 31A or 31B.

Method 1

Given $N_{comb}$ sets of 3-D parameters, compute the resulting output image velocity vectors $Vout_k^i$ at every feature point $F_k^i$. Then compute the "overall velocity estimation error":

$$E_{vel}^k = \Sigma_i \|Vout_k^i - Vin_k^i\|^2$$

The combination that minimizes the overall velocity estimation error is chosen as the best set of camera parameters. This process provides accurate results even in the presence of outliers in the feature point correspondence pairs that may have survived the outlier removal procedures. An "early exit" condition may be used to detect when a satisfactory estimate of the motion parameters is found and stop searching. The condition is that for every combination the percentage of points $F_k^i$ is computed that satisfy the inequality $\|Vout_k^i - Vin_k^i\| \leq T_v$, where $T_v$ is a specified maximum accepted velocity error in pixels per frame. If such percentage is higher than a minimum required performance percentage $T_{perf}$, then no further search is required as this combination satisfies the minimum requirement. The camera motion parameters produced by this combination of feature points is accurate enough as long as $T_{perf}$ is strict enough, such as $T_v$=0.25 and $T_{perf}$=90.

Method 2

Given $N_{comb}$ sets of 3-D parameters the best camera parameters are found in a statistical sense. The best translation vector is obtained as $$T = 1/N_{comb} \begin{vmatrix} \Sigma_{m=1 \rightarrow Ncomb} t_x^m \\ \Sigma_{m=1 \rightarrow Ncomb} t_y^m \\ \Sigma_{m=1 \rightarrow Ncomb} t_z^m \end{vmatrix}$$

where $t_x^m$, $t_y^m$ and $t_z^m$ are the components of the T vector resulting from the $m^{th}$ random combination of feature points. The resulting T vector is then normalized so that $\|T\|=1$ (if $t_x=t_y=t_z=0$ then T is left as a zero vector). This normalization of T does not affect the results because T is only estimated up to a scaling factor.

To estimate the best rotation matrix R the statistics of the angles of rotation, namely [αβγθ]. α, β and γ describe the axis of rotation and are subject to the constraint that $$\cos^2(\alpha) + \cos^2(\beta) + \cos^2(\gamma) = 1$$

and θ specifies the angle of rotation about such axis.

To compute [αβγ]:

(i) Choose $\alpha_1$, the angle α, β or γ with the smallest variance—the best value of such angle is its own statistical mean. Then $$\alpha_1 = (1/N_{comb})\Sigma_{m=1 \rightarrow Ncomb}\alpha_1^m.$$

(ii) Choose $\alpha_2$, the angle α, β or γ with the second smallest variance, the best value of such angle being its own mean constrained $$\alpha_2 = (1/card(Y))\Sigma_{m \in Y}\alpha_2^m$$

where $Y = \{m | m \in \{1, \ldots, N_{comb}\}$ and $\cos^2(\alpha_1) + \cos^2(\alpha_2^m) \leq 1\}$, card(Y) being the number of elements in Y.

(iii) Choose $\alpha_3$, the angle with the greatest variance, the best value being $\alpha_3 = \arccos \text{SQRT}(1 - \cos^2\alpha_1 - \cos^2\alpha_2)$.

Finally the angle of rotation is determined by its own mean, namely $\theta = (1/N_{comb})\Sigma_{m=1 \rightarrow Ncomb}\theta^m$.

After all four best angles are computed the rotation matrix R is formed which corresponds to such angles.

$$R = \begin{vmatrix} n_1^2 + (1-n_1^2)\cos\theta & n_1n_2(1-\cos\theta) - n_3\sin\theta & n_1n_3(1-\cos\theta) + n_2\sin\theta \\ n_1n_2(1-\cos\theta) + n_3\sin\theta & n_2^2 + (1-n_2^2)\cos\theta & n_2n_3(1-\cos\theta) - n_1\sin\theta \\ n_1n_3(1-\cos\theta) - n_2\sin\theta & n_2n_3(1-\cos\theta) + n_1\sin\theta & n_3^2 + (1-n_3^2)\cos\theta \end{vmatrix}$$

where $n_1 = \cos\alpha$, $n_2 = \cos\beta$ and $n_3 = \cos\gamma$.

Either of the above methods produce a best estimate for the 3-D camera motion parameters. It is possible that a small subset of feature points have corresponding negative depths. Since the above estimated camera parameters give an accurate result for the large majority of feature points, the small subset of points with negative depths is tagged as outliers and discarded. The output of the SFM submodule 28 is the best set of 3-D camera parameters and the depth at the location of the image feature points in $F_k$.

Continuous depth for all points in an image are obtained by interpolation from the depths at the feature points. From the sets of feature points present in the image pair and an estimate of the depth at each feature point, and assuming that the feature points are chosen so that they lie relatively close to each other and span the whole image, the depth map generator 30 creates a 2-D mesh structure by interconnecting such feature points in which the feature points lie at the vertices of formed polygons. The closer the feature points are to each other, the denser the resulting 2-D mesh structure. Since the depth at each vertex of the 2-D structure is known, the depths at the points within each polygon may be estimated. In this way the depth at all image pixel positions may be estimated. This may be done by planar interpolation, as described below.

A robust and fast method of generating the 2-D mesh structure is Delaunay triangulation. The feature points are connected to form a set of triangles whose vertices lie at feature point positions. Using the depth associated with each feature point and its corresponding vertex, a "depth plane" may be fitted to each individual triangle from which the depths of every point within the triangle may be determined.

Figure 7A:
FIGS. 7A, 7B and 7C respectively are illustrations of an image in a scene from a video sequence, a depth map for the image, and a segmentation mask for a foreground object in the image according to the present invention.
Figure 7B:
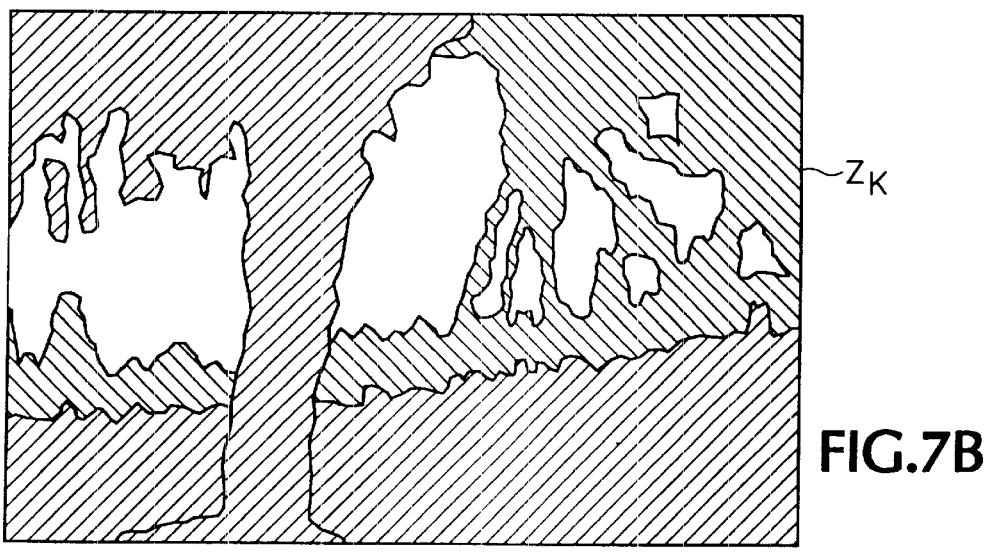

As a rule feature points at or very close to the boundaries of the image are not chosen to avoid having problems with artifacts in image boundaries and to avoid wasting time tracking points which may go out of the frame in subsequent images of the sequence. Therefore depths at or very close to the image boundaries cannot be obtained using the above procedure. Depth at or near image boundaries may be obtained by extrapolating from the known depths of the closest points near the target boundary point. A measure of the weighted average of the depths at neighboring points is used. In this measure the weights are inversely proportional to the distance from the target boundary point and the neighboring points with known depths. In this way the points closest to the target image boundary point have greater effect than more distant points. From the depth map generator 30 an image $Z_k$ is obtained that contains the estimated depths for every pixel position in image $I_k$. A typical result is shown in FIG. 7 where FIG. 7a represents the image $I_k$ and FIG. 7b respresents the image $Z_k$.

The density of the map is the user's choice. If the desired output is a dense depth map, then the user may so specify and a high number of feature points is selected. Otherwise default values are applied and the process runs faster with fewer feature points. This is the end of the SFM algorithm 16. From the input images $I_k$ and $I_{k+1}$ the final products are the sets of feature points $F_k$ and $F_{k+1}$, the rotation matrix R, the translation vector T and the depth map $Z_k$.

The decision block 18 has the role of determining, given the segmentation, 3-D camera parameters and scene depth information, for which objects the system generates 2-D extended images. The decision to generate 2-D extended images is based on the fact that the depth of each foreground or background object exhibits a small spread relative to its average value. If $Z^\alpha$ is the average depth value for the αth object, and if $\Delta Z^\alpha$ is the largest difference in depth between pairs of object points, then the condition for a small depth spread is $|\Delta Z^\alpha|/Z^\alpha \ll 1$. This means that the αth object is considered as "flat" relative to a given collection of camera view points for which the depth values were computed. In general the flatness condition occurs when the objects are far from the camera, such that $Z^\alpha$ is large, or when the objects are flat themselves. In addition to the flatness condition for each individual object, a further decision is made on how far each object is relative to the other objects and how these objects are distributed in 3-D space according to their depth. The relative object depth is determined by the ratios of their average depth values, and their 3-D distribution is based on the relative ordering of the average depth values, i.e., in ascending order.

If the objects are considered to be "flat" and they are ordered in a sequence of superimposed layers, then the decision block 18 determines that 2-D extended images should be generated for each layer.

Figure 7C:
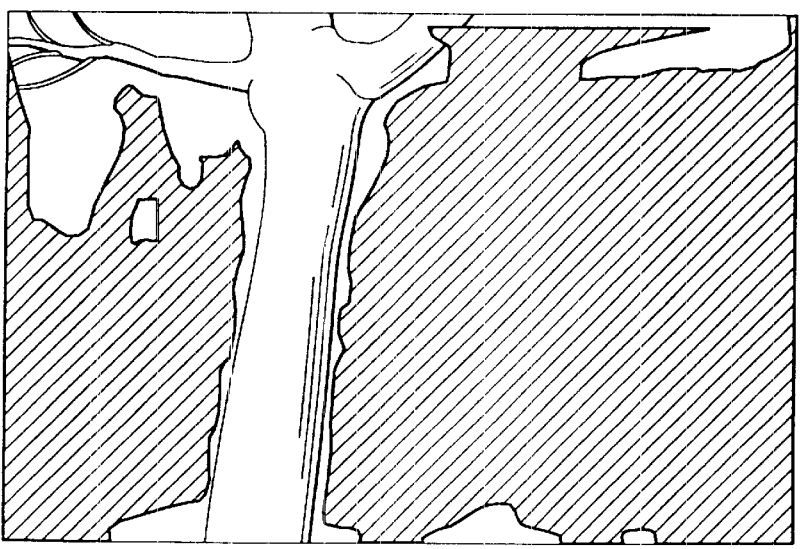

The decision block 18 also generates feedback information to the pre-segmentor 14, as shown in FIG. 1. This occurs when depth information about a given object is used to further segment it, such as separating a foreground tree from an image as shown in FIG. 7c.

The input video may be thought to represent one or more physically meaningful objects. A 2-D extended image may be generated for each object, and more commonly for the background object. The location and shape of the object of interest is available as an alpha image map, as shown in FIG. 3b. The alpha map is an image having the same dimensions as the input images $I_k$, and may be generated through depth segmentation performed as part of the decision process or by other means as described above. For certain kinds of input video materials, where (a) object segmentation is performed by other means and (b) motion between consecutive frames is not significant, the outputs from the SFM algorithm, R, T and Z, are optional. For this simple subset of video a refine prediction box 34, as shown in FIG. 8, uses the refined parameters generated using a previous picture as an initial approximation (coarse or rough estimates). The amount of motion that the 2-D extended image generator 20 can handle without inputs from the SFM algorithm depends on (a) the number of levels of the pyramid used in refining parameters and (b) the presence or absence of local minima in the cost function used in refining parameters. $I_k(x,y)$ represents the intensity (luminance) at location (x,y), and $U_k(x,y)$ and $V_k(x,y)$ represent the chrominance values. A value of $A_k(x,y) \leq T_\alpha$ means the pixel at position (x,y) belongs to the object of interest, otherwise it doesn't. The rotation, translation and depth maps are estimated by the SFM algorithm, as described above, and the median of the estimated depth map at valid pixel locations for the object is determined.

An integrator 32 is used to generate the 2-D extended image $W_k$ at time instances 1 through k by combining SFM information with PPP information. The intensity component of the 2-D extended image is $WI_k$, the chrominance components are $WU_k$ and $WV_k$, and the alpha component is $WA_k$. One goal of 2-D extended image generation is to be able to predict input images at time instances 1 through k from $W_k$. A nine parameter plane perspective projection (PPP) is used to perform the prediction:

$$I_k(x,y)=\rho_k*WI_k(f_k(x,y),g_k(x,y))$$

$$U_k(x,y)=\rho_k*WU_k(f_k(x,y),g_k(x,y))$$

$$V_k(x,y)=\rho_k*WV_k(f_k(x,y),g_k(x,y))$$

$$A_k(x,y)=\rho_k*WA_k(f_k(x,y),g_k(x,y))$$

where $f_k$ and $g_k$ are defined through:

$$f_k(x,y)=\{P_k(0,0)*x+P_k(0,1)*y+P_k(0,2)\}/\{P_k(2,0)*x+P_k(2,1)*y+P_k(2,2)\}$$

$$g_k(x,y)=\{P_k(1,0)*x+P_k(1,1)*y+P_k(1,2)\}/\{P_k(2,0)*x+P_k(2,1)*y+P_k(2,2)\}$$

$P_k(2,2)$ is forced to be 1.

The goal of 2-D extended image generation is to compute the planar image $W_k$ and associated $P_k$ and $\rho_k$ for each k. At termination where k=K the final $W_K$ and the history of $P_K$ and $\rho_k$ may be used to synthesize images $I_k, U_k, V_k, 1 \leq k \leq N$. For each k the nine parameters, i.e., eight unknown components of the 3×3 matrix $P_k$ and $\rho_k$, are estimated such that the synthesized images are:

$$I'_k \approx I_k$$

$$U'_k \approx U_k$$

$$V'_k \approx V_k$$

$$A'_k \approx A_k$$

The cost function used to achieve this approximation is:

$$MSE(P_k,\rho_k)\Delta(1/N_v)\{\Sigma_{(x,y)}||I_k(x,y)-I'_k(x,y)||^2\}$$

where (x,y) in the above summation is such that $A'_k(x,y) \geq T_\alpha$ and $A_k(x,y) \geq T_\alpha$ and $N_v$ is the number of valid pixel locations (x,y).

The first 2-D extended image generated is equal to the first image in the scene shot.

$$k=1$$

$$WI_1=I_1$$

$$WU_1=U_1$$

$$WV_1=V_1$$

$$WA_1=A_1$$

and the estimated parameters are simply:

$$P_1 = \begin{vmatrix} 1 & 0 & 0 \\ 0 & 1 & 0 \\ 0 & 0 & 1 \end{vmatrix}$$

$$\rho_1 = 1$$

such that $$f_1(x,y)=x$$

$$g_1(x,y)=y$$

Initialize an image "HITS" of dimensions equal to those of $I_k$.

$$HITS(x,y)=1 \text{ if } A_1(x,y) \geq T_\alpha$$

For every new picture $I_k$, k>1, from the input video sequence SFM is optionally performed between the previous image $I_{k-1}$ and the present image $I_k$ to obtain $T_{k-1}, R_{k-1}$ and $Z_{k-1}$ for the previous image. From the previous image depth map a representative depth for interested objects in the previous picture is obtained as $$Z'=\text{median}\{\text{all } Z_{k-1}(x,y), \text{ where } A_{k-1}(x,y) \geq T_\alpha\}$$

Then a 3×3 matrix $Q_{k-1}$ is computed:

$$Q_{k-1}=R^{-1}_{k-1}-(1/Z')R^{-1}_{k-1}T[001].$$

$Q_{k-1}$ is normalized so that the element in the last-row, last-column of $Q_{k-1}$, i.e., $Q_{k-1}(2,2)$, equals 1.0:

$$Q_{k-1} \leftarrow Q_{k-1}/Q_{k-1}(2,2)$$

Given a point $(x_n,y_n)$ in normalized coordinates of image $I_k$, $Q_{k-1}$ is used to find an approximate location $(x'_n,y'_n)$ of the corresponding point in image $I_{k-1}$ as:

$$x'_n=\{Q_{k-1}(0,0)*x_n+Q_{k-1}(0,1)*y_n+Q_{k-1}(0,2)\}/\{Q_{k-1}(2,0)*x_n+Q_{k-1}(2,1)*y_n+Q_{k-1}(2,2)\}$$

$$y'_n=\{Q_{k-1}(1,0)*x_n+Q_{k-1}(1,1)*y_n+Q_{k-1}(1,2)\}/\{Q_{k-1}(2,0)*x_n+Q_{k-1}(2,1)*y_n+Q_{k-1}(2,2)\}$$

The normalized coordinates $(x'_n,y'_n)$ may be converted to pixel coordinates (x',y') through $$x'=(x'_n+1)(N_{cols}-1)/2$$

$$y'=(y'_n+1)(N_{rows}-1)/2$$

where $N_{cols}$ and $N_{rows}$ refer to the input image dimensions. The corresponding point (x",y") in $W_{k-1}$ is:

$$x''=f_{k-1}(x',y')$$

$$y''=g_{k-1}(x',y')$$

Thus for a given point in $I_k$ a corresponding point may be found in $W_{k-1}$. This correspondence is used to obtain approximate $P_k$ as follows:

1. For the four corner points in $I_k$ corresponding points are found in $W_{k-1}$, i.e., for (x,y)=(0,0), (width-1,0), (0,height-1) and (width-1,height-1) the (x",y")s are found using the above equations.
2. Using the four sets of (x,y) and corresponding (x",y") the linear equations for the eight unknown element of matrix $P_k$ defined by:

$$x''=f_k(x,y)=\{P_k(0,0)*x+P_k(0,1)*y+P_k(0,2)\}/\{P_k(2,0)*x+P_k(2,1)*y+P_k(2,2)\}$$

$$y''=g_k(x,y)=\{P_k(1,0)*x+P_k(1,1)*y+P_k(1,2)\}/\{P_k(2,0)*x+P_k(2,1)*y+P_k(2,2)\}$$

are solved with the understanding that $P_k(2,2)=1$.

The matrix $P_k$ obtained serves as an initial approximation, which is refined using the following procedure. If SFM is not performed, $Q_{k-1}$ is not available and $P_{k-1}$ serves as the approximate $P_k$ to be refined.

Figure 9:
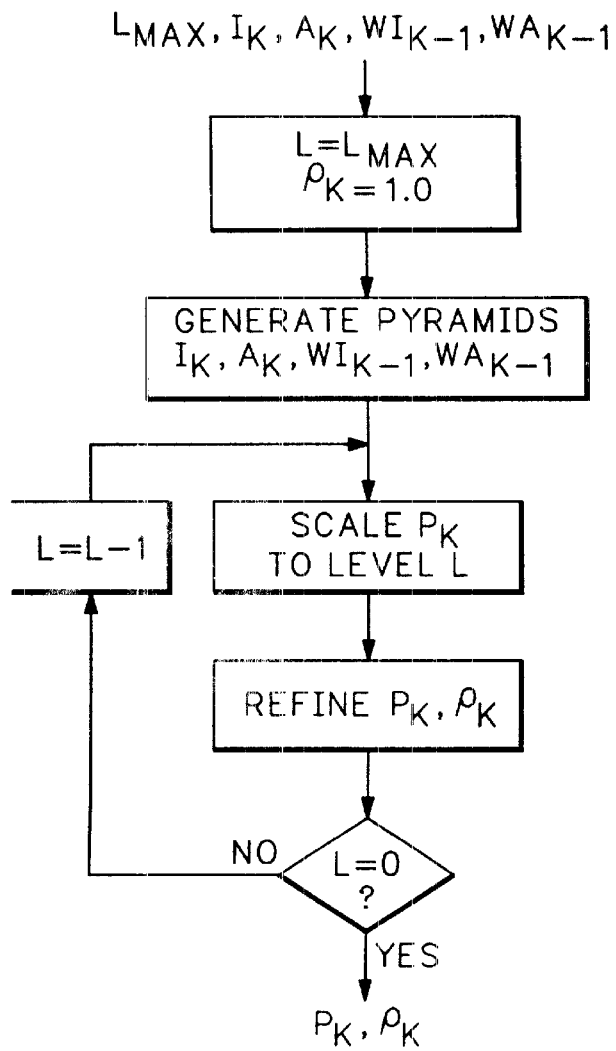
FIG. 9 is an illustration of the pasting of points of an image in a scene from a video sequence into a 2-D extended image according to the present invention.
Figure 10:
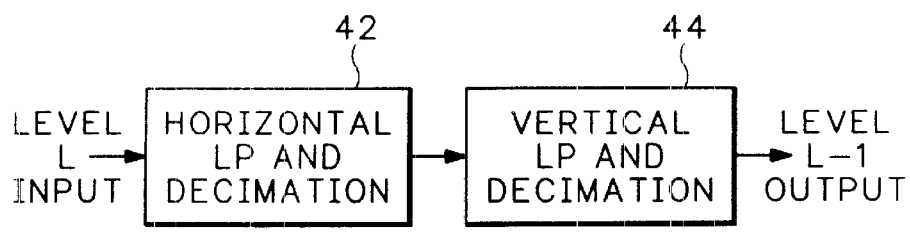
FIG. 10 is a flow diagram view of a filter for producing diadic pyramids according to the present invention.

The approximate $P_k$ from above is refined using the intensity and alpha components of the input image and the presently existing 2-D planar image. The refinement attempts to minimize a mean-squared-error over all possible $P_k$ and $\rho_k$. The refinement process is shown in FIG. 9. The full resolution input image is considered to be the level 0 representation in a diadic pyramid. Separable filters are used to generate the diadic pyramid. Other types of filtering schemes could equally well be used for this purpose. Given an image at level L, the image at level L−1 is obtained using the system shown in FIG. 10. Each lowpass filter in this figure computes outputs only at half the input sample positions. For example the lowpass filter may have a length of 5 and filter coefficients of (13/256, 64/256, 102/256, 64/256, 13/256). This structure is repeatedly used to generate an $L_{max}+1$ level pyramid consisting of images at levels $0,1,\ldots,L_{max}$. Note that this $L_{max}$ may be different from that used in the hierarchical matching described above. For example in one implementation $L_{max}=2$. For the hierarchical refinement of $P_k$ and $\rho_k$ pyramids of $I_k$, $A_k$, $WI_{k-1}$ and $WA_{k-1}$ are generated.

Given $P_k$ for images at level $L=L_1$, $P_k$ may be scaled so that it may be applied on images at level $L=L_2$ through:

$$P_k(0,2)=2^{L1-L2}*P_k(0,2)$$

$$P_k(1,2)=2^{L1-L2}*P_k(1,2)$$

$$P_k(2,0)=2^{L2-L1}*P_k(2,0)$$

$$P_k(2,1)=2^{L2-L1}*P_k(2,1)$$

Other elements of $P_k$ and $\rho_k$ remain unchanged in this scaling process.

To refine $P_k$ at a given level of the pyramid:

1. Using the current values of $P_k$ and $\rho_k$, compute $I'_k$ and $A'_k$ as above, and then the mean squared error, MSE $(P_k,\rho_k)$.
2. Estimate a value $\rho'_k$:

$$\rho'_k=\Sigma_{(x,y)}I_k(x,y)/\Sigma_{(x,y)}I'_k(x,y)$$

where (x,y) a valid pixel location.
3. Using the current $P_k$ and $\rho'_k$ compute $I'_k$ and $A'_k$ and the resulting mean squared error, $MSE(P_k,\rho'_k)$
4. Decide between $\rho_k$ and $\rho'_k$ as follows. If $MSE(P_k,\rho'_k)$ <$MSE(P_k,\rho_k)$, then $\rho_k=\rho'_k$ and $bestMSE=MSE(P_k,\rho'_k)$; otherwise retain the value of $\rho_k$ and $bestMSE=MSE(P_k,\rho_k)$.
5. Set a counter ctr=0, $bestP_k=P_k$, $TmpP_k=P_k$.
6. Initialize all elements of an 8×8 matrix A and an 8×1 vector B to zero, set a counter overlapCnt=0 and set an accumulator error=0.0.
7. For each valid position (x,y) in image $I_k$ do:
   Compute (x',y') using current values of $TmpP_k$ and $\rho_k$, $x'=f_k(x,y)$ and $y'=g_k(x,y)$.
   In general (x',y') are not integers but real numbers.
   If (x'y') falls within the boundaries of $WI_k$ and if $WA_{k-1}$ at the four pixels (x',y') supporting the nearest pixel (x',y') indicate validity, do:
   overlapCnt=overlapCnt+1
   Through bilinear interpolation compute $$I'_k(x,y)=\rho_k*WI_{k-1}(x',y').$$

Set error=error+$\{I_k(x,y)-I'_k(x,y)\}^2$
Compute partial differentials $$dedp(0)\Delta\delta error/\delta TmpP_k(0,0)=(x*\rho_k/Den)(\delta WI_{k-1}(x',y')/\delta x'$$

$$dedp(1)\Delta\delta error/\delta TmpP_k(0,1)=(y*\rho_k/Den)(\delta WI_{k-1}(x',y')/\delta x'$$

$$dedp(2)\Delta\delta error/\delta TmpP_k(0,2)=(\rho_k/Den)(\delta WI_{k-1}(x',y')/\delta x'$$

$$dedp(3)\Delta\delta error/\delta TmpP_k(1,0)=(x*\rho_k/Den)(\delta WI_{k-1}(x',y')/\delta y'$$

$$dedp(4)\Delta\delta error/\delta TmpP_k(1,1)=(y*\rho_k/Den)(\delta WI_{k-1}(x',y')/\delta y'$$

$$dedp(5)\Delta\delta error/\delta TmpP_k(1,2)=(\rho_k/Den)(\delta WI_{k-1}(x',y')/\delta y'$$

$$dedp(6)\Delta\delta error/\delta TmpP_k(2,0)=(-x*\rho_k/Den)\{x'*(\delta WI_{k-1}(x',y')/\delta x')+y'*(\delta WI_{k-1}(x',y')/\delta y')\}$$

$$dedp(7)\Delta\delta error/\delta TmpP_k(2,1)=(-y*\rho_k/Den)\{x'*(\delta WI_{k-1}(x',y')/\delta x')+y'*(\delta WI_{k-1}(x',y')/\delta y')\}$$

where the denominator "Den" is given by:

$$Den=TmpP_k(2,0)*x+TmpP_k(2,1)*y+TmpP_k(2,2)$$

and the partial differentials are computed taking into account the non-integer values of x' and y'.
Next perform the two loops:
For k=0 to 7, for l=0 to 7, do:

$$A(k,l)=A(k,l)+dedp(k)*dedp(l)$$

done.
For k=0 to 7, do:

$$B(k)=B(k)-error*dedp(k)$$

done.
done.
done.
8. If (error/overlapCnt)<bestMSE,
   bestMSE=error/overlapCnt
   $bestP_k=TmpP_k$
Otherwise do not change bestMSE and $bestP_k$.
9. Update $TmpP_k$:

$$TmpP_k=TmpP_k+T_s*(A^TA)^{-1}A^TB$$

where $T_s$ is a selectable stepsize for updating $TmpP_k$, such as 0.5.
10. If the changes to $TmpP_k$ are significant, i.e., max$\{(A^TA)^{-1}A^TB\}>T_d$ and if cnt<$T_c$, continue the iterations by going to step 6. Otherwise the iterations may be terminated and go to the next step. Representative values for $T_d$ and $T_c$ are $1.0^{-10}$ and 10.
11. If the fraction number of pixels predicted, (overlapCnt)/(Number of samples in $I_k$ with $A_k \geq T_a$) $\geq T_f$ set $P_k=bestP_k$. Otherwise $P_k$ could not be changed based on the iterations just performed. Here $T_f$ is a threshold which equalled 0.5 in one implementation.

The quantity "error" above is not guaranteed to be monotoniclly decreasing with iterations. For this reason matrices $TmpP_k$, $bestP_k$ and quantity bestMSE are used. These quantities enable the capture of the value of $P_k$ that results in minimum mean-squared-error while performing the iterative procedure above.

Figure 11:
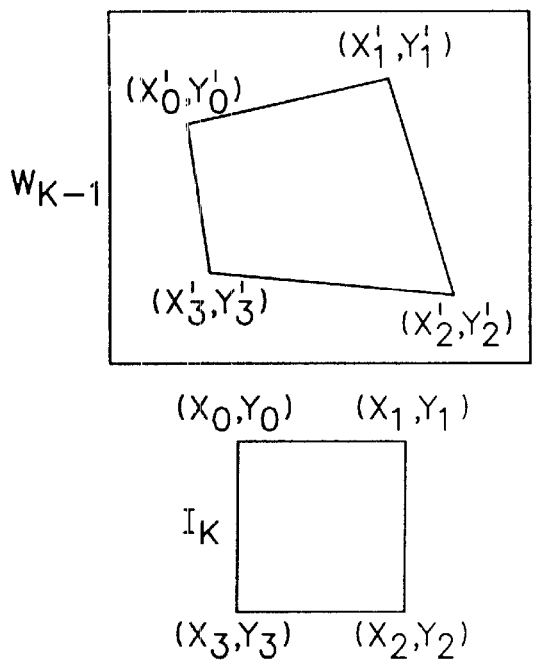
FIG. 11 is an illustrative view of the mapping of points from an image from the video sequence into the 2-D extended image according to the present invention.

In the pasting block 38 the images $I_k$, $U_k$, $V_k$ and $A_k$ are combined with corresponding components of $W_{k-1}$ using $P_k$ and $\rho_k$ to generate $W_k$:

1. Compute the corresponding positions of the four corner pixels $(x_i,y_i)$ of $I_k$ in $W_{k-1}$ $(x'_i,y'_i)$, as illustrated in FIG. 11, using $P_k$ and $$x'=f_k(x,y)$$

$$y'=g_k(x,y)$$

$$(x_0,y_0)=(0,0)$$

$$(x_1,y_1)=(\text{width-1},0)$$

$(x_2,y_2)=(\text{width-1},\text{height-1})$ $(x_3,y_3)=(0,\text{height-1})$ where width and height refer to the width and height of $I_k$. Values of $(x'_i,y'_i)$ are forwarded to the refresh decider block 40.

2. Compute $\max_i\{x'_i\}$, $\max_i\{y'_i\}$, $\min_i\{x'_i\}$ and $\min_i\{y'_i\}$.
3. If $\min_i\{x'_i\}<0$, leftgrow=$\min_i\{x'_i\}$, otherwise leftgrow=0.
4. If $\min_i\{y'_i\}<0$, topgrow=$\min_i\{y'_i\}$, otherwise topgrow=0.
5. If $\max_i\{x'_i\}\geq\text{WidthofW}_{k-1}$, rightgrow=$\max_i\{x'_i\}+1-\text{WidthofW}_{k-1}$, otherwise rightgrow=0.
6. If $\max_i\{y'_i\}\geq\text{HeightofW}_{k-1}$, bottomgrow=$\max_i\{y'_i\}+1-\text{HeightofW}_{k-1}$, otherwise bottomgrow=0.
7. Pad $W_{k-1}$ and HITS in the left with leftgrow columns of pixels, in the right with rightgrow columns of pixels, in the top with topgrow rows of pixels, and in the bottom with bottomgrow rows of pixels. This involves padding all the four components of $W_{k-1}$ and HITS with the above amounts. As padding material black pixels are used, i.e., $WI_{k-1}$, $WA_{k-1}$ and HITS are padded with 0 while $WU_{k-1}$ and $WV_{k-1}$ are padded with 128 if the source material is 8-bits per component.
8. Update $P_k$ due to change in dimensions of $W_{k-1}$:

$$P_k(0,0)=P_k(0,1)+\text{leftgrow}$$

$$P_k(0,1)=P_k(0,1)+\text{leftgrow}$$

$$P_k(0,2)=P_k(0,2)+\text{leftgrow}$$

$$P_k(1,0)=P_k(1,0)+\text{topgrow}$$

$$P_k(1,1)=P_k(1,1)+\text{topgrow}$$

$$P_k(1,2)=P_k(1,2)+\text{topgrow}$$

9. Project $\{I_k,U_k,V_k,A_k\}$ to make them look like $W_{k-1}$ by computing the inverse $P_{k,inv}$ to $P_k$:

$$P_{k,inv}(0,0)=(P_k(1,1)*P_k(2,2)-P_k(2,1)*P_k(1,2))/(P_k(0,0)*P_k(1,1)-P_k(1,0)*P_k(0,1))$$

$$P_{k,inv}(0,1)=(P_k(0,2)*P_k(2,1)-P_k(2,2)*P_k(0,1))/(P_k(0,0)*P_k(1,1)-P_k(1,0)*P_k(0,1))$$

$$P_{k,inv}(0,2)=(P_k(1,2)*P_k(0,1)-P_k(0,2)*P_k(1,1))/(P_k(0,0)*P_k(1,1)-P_k(1,0)*P_k(0,1))$$

$$P_{k,inv}(1,0)=(P_k(1,2)*P_k(2,0)-P_k(1,0)*P_k(2,2))/(P_k(0,0)*P_k(1,1)-P_k(1,0)*P_k(0,1))$$

$$P_{k,inv}(1,1)=(P_k(2,2)*P_k(0,0)-P_k(0,2)*P_k(2,0))/(P_k(0,0)*P_k(1,1)-P_k(1,0)*P_k(0,1))$$

$$P_{k,inv}(1,2)=(P_k(0,2)*P_k(1,0)-P_k(1,2)*P_k(0,0))/(P_k(0,0)*P_k(1,1)-P_k(1,0)*P_k(0,1))$$

$$P_{k,inv}(2,0)=(P_k(2,1)*P_k(1,0)-P_k(1,1)*P_k(2,0))/(P_k(0,0)*P_k(1,1)-P_k(1,0)*P_k(0,1))$$

$$P_{k,inv}(2,1)=(P_k(0,1)*P_k(2,0)-P_k(0,0)*P_k(2,1))/(P_k(0,0)*P_k(1,1)-P_k(1,0)*P_k(0,1))$$

$$P_{k,inv}(2,2)=1$$

Next $I_k,U_k,V_k,A_k$ are projected to form $WI'_k$, $WU'_k$, $WV'_k$, $WA'_k$ that appear like $WI_{k-1}$, $WU_{k-1}$, $WV_{k-1}$, $WA_{k-1}$ respectively:

$$WI'_k(x,y)=(1.0/\rho_k)I_k(f_{k,inv}(x,y),g_{k,inv}(x,y))$$

$$WU'_k(x,y)=(1.0/\rho_k)U_k(f_{k,inv}(x,y),g_{k,inv}(x,y))$$

$$WV'_k(x,y)=(1.0/\rho_k)V_k(f_{k,inv}(x,y),g_{k,inv}(x,y))$$

$$WA'_k(x,y)=(1.0/\rho_k)A_k(f_{k,inv}(x,y),g_{k,inv}(x,y))$$

where $f_{k,inv}$ and $g_{k,inv}$ are defined through:

$$f_{k,inv}(x,y)=(P_{k,inv}(0,0)*x+P_{k,inv}(0,1)*y+P_{k,inv}(0,2))/(P_{k,inv}(2,0)*x+P_{k,inv}(2,1)*y+P_{k,inv}(2,2))$$

$$g_{k,inv}(x,y)=(P_{k,inv}(1,0)*x+P_{k,inv}(1,1)*y+P_{k,inv}(1,2))/(P_{k,inv}(2,0)*x+P_{k,inv}(2,1)*y+P_{k,inv}(2,2))$$

Bilinear interpolation is used to obtain values of $I_k,U_k,V_k,A_k$ at non-integer values of $f_{k,inv}(x,y)$ and $g_{k,inv}(x,y)$.

10. Combine $WI'_k$, $WU'_k$, $WV'_k$, $WA'_k$ with $WI_{k-1}$, $WU_{k-1}$, $WV_{k-1}$, $WA_{k-1}$ through weighted summation. Specifically if $WA'_k(x,y)\geq T_a$ and $WA_{k-1}\geq T_a$, $$WI_k(x,y)=(1.0-\gamma_i)*WI_{k-1}(x,y)+\gamma_i*WI'_{k-1}(x,y)$$

$$WU_k(x,y)=(1.0-\gamma_u)*WU_{k-1}(x,y)+\gamma_u*WU'_{k-1}(x,y)$$

$$WV_k(x,y)=(1.0-\gamma_v)*WV_{k-1}(x,y)+\gamma_v*WV'_{k-1}(x,y)$$

$$WA_k(x,y)=(1.0-\gamma_a)*WA_{k-1}(x,y)+\gamma_a*WA'_{k-1}(x,y)$$

$$HITS(x,y)=HITS(x,y)+1$$

where $\gamma_i, \gamma_u, \gamma_v$ and $\gamma_a$ are selectable scalars in the range 0 to 1. Otherwise if $WA'_k(x,y)\geq T_a$ $$WI_k(x,y)=WI'_k(x,y)$$

$$WU_k(x,y)=WU'_k(x,y)$$

$$WV_k(x,y)=WV'_k(x,y)$$

$$WA_k(x,y)=WA'_k(x,y)$$

otherwise $$WI_k(x,y)=WI_{k-1}(x,y)$$

$$WU_k(x,y)=WU_{k-1}(x,y)$$

$$WV_k(x,y)=WV_{k-1}(x,y)$$

$$WA_k(x,y)=WA_{k-1}(x,y)$$

Some special cases of the scalars are:
(a) $\gamma=0$. This means copying or propagating old pixel values available in $W_{k-1}$ to $W_k$ as much as possible, implying that older values in the planar image are given importance and are retained.
(b) $\gamma=0.5$. This gives equal weights to the accumulated information from old input images and the information in the new input image.
(c) $\gamma=1.0/\sqrt{2}$. This means the contribution coming from any particular image in the planar image falls off exponentially as the process goes through the sequence of input images. This particular value provides the largest value with convergence property to the temporal integration, i.e., summation, happening at each position of the planar image.
(d) $\gamma=1$. This means destroying old pixel values in $W_{k-1}$ as much as possible and copying the new information available in $I_k$ into the planar image.
(e) $\gamma=1/HITS(x,y)$. This value give equal weight to each image that contributes to location (x,y) in the planar image.

The decision to terminate the evolution of the current 2-D planar image and start a new planar image is made by the refresh decide block 40, and is based on several criteria:

1. End of Sequence. The process is terminated if all the input images in the input video have been processed.
2. Scene Change. If a scene change is identified by the scene cut detector 12, a new planar image is created for the subsequent scene shot.
3. Memory Constraints. A decision is made to refresh the planar image if any of the following are true:
   (a) WidthofW$_{k-1} \geq T_{wid}$,
   (b) HeightofW$_{k-1} \geq T_{hei}$,
   (c) AreaofW$_{k-1} \geq T_{area}$
   where the thresholds are selectable, for example, may be 2048, 2048 and $2^{21}$ respectively.
4. Excessive camera zoom-in or zoom-out. If there is a large zoom-out happening in the video with respect to the first image, the planar image size grows big, even after preprocessing only a few input images, making the planar image inefficient for compression purposes. Also the resulting planar image is blurred. On the other hand if there is a large zoom-in happening with respect to the first image, the updates to the planar image are small from picture to picture. The process of pasting onto the planar image is quite lossy for the details (higher spatial frequency information) present in the input image. Therefore when a large zoom-in or zoom-out is detected with respect to the first input image, a decision is made to refresh the planar image. Based on the values of $(x'_i, y'_i)$ computed above in the refinement process, the detection of the presence of large zoom-in or zoom-out is made as follows:
   (i) denoting by width and height the widths and heights of $I_k$, a large zoom-in is determined if any of the following are true:
   (a) $\min\{\text{SQRT}((x'_0-x'_3)^2+(y'_0-y'_3)^2), \text{SQRT}((x'_1-x'_2)^2+(y'_1-y'_2)^2)\} \leq (T_{minh}*\text{height})$
   (b) $\min\{\text{SQRT}((x'_0-x'_1)^2+(y'_0-y'_1)^2), \text{SQRT}((x'_3-x'_2)^2+(y'_3-y'_2)^2)\} \leq (T_{minw}*\text{width})$
   (c) area of the polygon $\{(x'_0,y'_0),(x'_1,y'_1),(x'_2,y'_2),(x'_3,y'_3)\} \leq (T_{mina}*\text{area})$
   where the thresholds are selectable, i.e., all equal to 0.5 in one implementation. The height, width and area (height*width) refer to $I_k$.
   Similarly a large zoom-out is identified for any of the following:
   (a) $\max\{\text{SQRT}((x'_0-x'_3)^2+(y'_0-y'_3)^2), \text{SQRT}((x'_1-x'_2)^2+(y'_1-y'_2)^2)\} \geq (T_{maxh}*\text{height})$
   (b) $\max\{\text{SQRT}((x'_0-x'_1)^2+(y'_0-y'_1)^2), \text{SQRT}((x'_3-x'_2)^2+(y'_3-y'_2)^2)\} \geq (T_{maxw}*\text{width})$
   (c) area of the polygon $\{(x'_0,y'_0),(x'_1,y'^1),(x'_2,y'_2),(x'_3,y'_3)\} \geq (T_{maxa}*\text{area})$
   where the thresholds are selectable, such as all being 2. Finally excessive zoom-in or zoom-out may also be detected by accumulating the 3-D translation vector $t_z$ components which indicate 3-D zoom-in or zoom-out, depending on their signs. This is only available when the SFM algorithm is being used.
5. Excessive camera rotation. If there is excessive rotation in 3-D by the camera with respect to the first image, there is excessive slew in the polygon area of the polygon $\{(x'_0,y'_0),(x'_1,y'_1),(x'_2,y'_2),(x'_3,y'_3)\}$. This implies that the planar image is missing some details present in the input images. The excessive rotation of the camera may be detected either based on cumulated $R_{k-1}$'s or based on the angles of the polygon. The rotation parameters are only available when the SFM algorithm is being used. If the minimum of four angles at vertices of the polygon is smaller than a given threshold, and excessive skew is detected, and a decision is made to refresh the planar image. This threshold may be 30°.

Thus the present invention provides for 2-D generation of extended images from a video sequence by processing pre-segmented objects from images in the video sequence using a surface-from-motion algorithm and, from resulting depth maps and camera motion parameters for each image, generating the 2-D extended image for flat or background objects.

What is claimed is:

1. A method of generating a 2-D extended image from a video sequence representing a natural 3-D scene comprising the steps of:

for a background object segmented from the video sequence, determining motion parameters for a camera that recorded the video sequence with respect to a 3-D coordinate system, and from the motion parameters determining a depth map representing the depth of each point in the background object from the camera; and from the motion parameters and depth map, generating the 2-D extended image for the background object as a composition of contiguous images from the video sequence, wherein the determining step comprises the steps of:

extracting feature points for the background object from an image of the video sequence;

tracking the features points for the background object into a next image of the video sequence to produce feature point correspondence pairs;

performing a structure-from-motion algorithm on the feature point correspondence pairs to produce a rotation matrix and a translation vector as the motion parameters as well as a depth value for each feature point in the image; and from the depth values generating the depth map.

2. The method as recited in claim 1 further comprising the step of pre-segmenting the background object from the video sequence prior to the determining step.

3. The method as recited in claim 2 further comprising the step of detecting scene cuts in the video sequence to divide the video sequence into a plurality of scene shots, each scene shot being processed separately by the pre-segmenting, determining and generating steps.

4. The method as recited in claim 1 wherein the tracking step further comprises the step of removing outliers from the feature point correspondence pairs prior to the performing step.

5. The method as recited in claim 1 wherein the performing step comprises the steps of:

pre-processing the feature point correspondence pairs to produce a plurality of sets of estimated motion parameters; and selecting from among the sets of estimated motion parameters a best set as the motion parameters.

6. The method as recited in claim 5 wherein the selecting step comprises the step of computing an overall velocity estimation error from input and output velocity vectors for every feature point, with the combination that minimizes the overall velocity estimation error being selected as the best set.

7. The method as recited in claim 5 wherein the selecting step comprises the step of statistically finding the best set from among the sets of estimated motion parameters.

8. The method as recited in claim 1 further comprising the step of deciding from the motion parameters and depth map whether to proceed with the generating step based upon a flatness criterion for the object.

9. The method as recited in claim 8 wherein the deciding step further comprises the step of providing a segmentation signal for use in further segmenting the background object.

10. A method of generating a 2-D extended image from a video sequence representing a natural 3-D scene comprising the steps of:

- for a background object segmented from the video sequence, determining motion parameters for a camera that recorded the video sequence with respect to a 3-D coordinate system, and from the motion parameters determining a depth map representing the depth of each point in the background object from the camera; and
- from the motion parameters and depth map, generating the 2-D extended image for the background object as a composition of contiguous images from the video sequence, wherein the generating step comprises the steps of:
  - predicting a next image of the background object as a coarse predicted image from a current version of the 2-D extended image;
  - refining the coarse predicted image to generate a predicted image;
  - pasting the predicted image to the current version of the 2-D extended image to generate the 2-D extended image; and
  - repeating the predicting, refining and pasting steps until an end condition is achieved.

11. The method as recited in claim 10 wherein the predicting step comprises the step of integrating the current version of the 2-D extended image with the motion parameters to produce the coarse predicted image.

12. The method as recited in claim 10 further comprising deciding from the 2-D extended image relative to a first image whether the end condition is achieved.

13. The method as recited in claim 10 further comprising deciding from the output of a scene-cut detector to which the video sequence is input whether a scene-cut has occurred as the end condition.

14. The method as recited in claim 10 further comprising the step of pre-segmenting the background object from the video sequence prior to the determining step.

15. The method as recited in claim 14 further comprising the step of detecting scene cuts in the video sequence to divide the video sequence into a plurality of scene shots, each scene shot being processed separately by teh pre-segmenting, determining and generating steps.

16. The method as recited in claim 10 further comprising the step of deciding from the motion parameters and depth map whether to proceed with the generating step based upon a flatness criterion for the object.

17. The method as recited in claim 16 wherein the deciding step further comprises the step of providing a segmentation signal for use in further segmenting the background object.

* * * * *